United States Patent [19]

Miram et al.

[11] 3,780,796

[45] Dec. 25, 1973

[54] MULTICOLOUR PRINTING PRESS COMPRISING A BACKING CYLINDER CONTAINING HEATING CHAMBERS

[75] Inventors: Horst Miram; Karl Heinz Schner, both of Lengerich, Germany

[73] Assignee: Windmoller & Holscher, Lengerich of Westphalia, Germany

[22] Filed: Nov. 12, 1971

[21] Appl. No.: 198,315

[30] Foreign Application Priority Data
Nov. 12, 1970 Germany .................. P 20 55 584.4

[52] U.S. Cl. ........................ 165/39, 165/64, 165/89
[51] Int. Cl. ............................................... B60h 1/00
[58] Field of Search ..................... 165/2, 26, 27, 22, 165/64, 65, 30, 89, 90, 39, 40

[56] References Cited
UNITED STATES PATENTS
2,788,264  4/1957  Bremer et al. ........................ 165/27
3,074,695  1/1963  Hold et al. ............................ 165/64

Primary Examiner—Charles Sukalo
Attorney—Fleit, Gipple & Jacobson

[57] ABSTRACT

In a multi-colour printing press comprising a backing cylinder containing heating chambers traversed by a medium which is heated in a flow circuit, the said circuit including a heater and a thermostat downstream of the heater for controlling the heater, overheating of the backing cylinder arising out of hunting in the control effected by the thermostat is minimised by a temperature regulator which is effective to introduce a controlled amount of cold medium in the flow path between the heater and the thermostat whenever the temperature of the heating medium exceeds a predetermined value.

5 Claims, 1 Drawing Figure

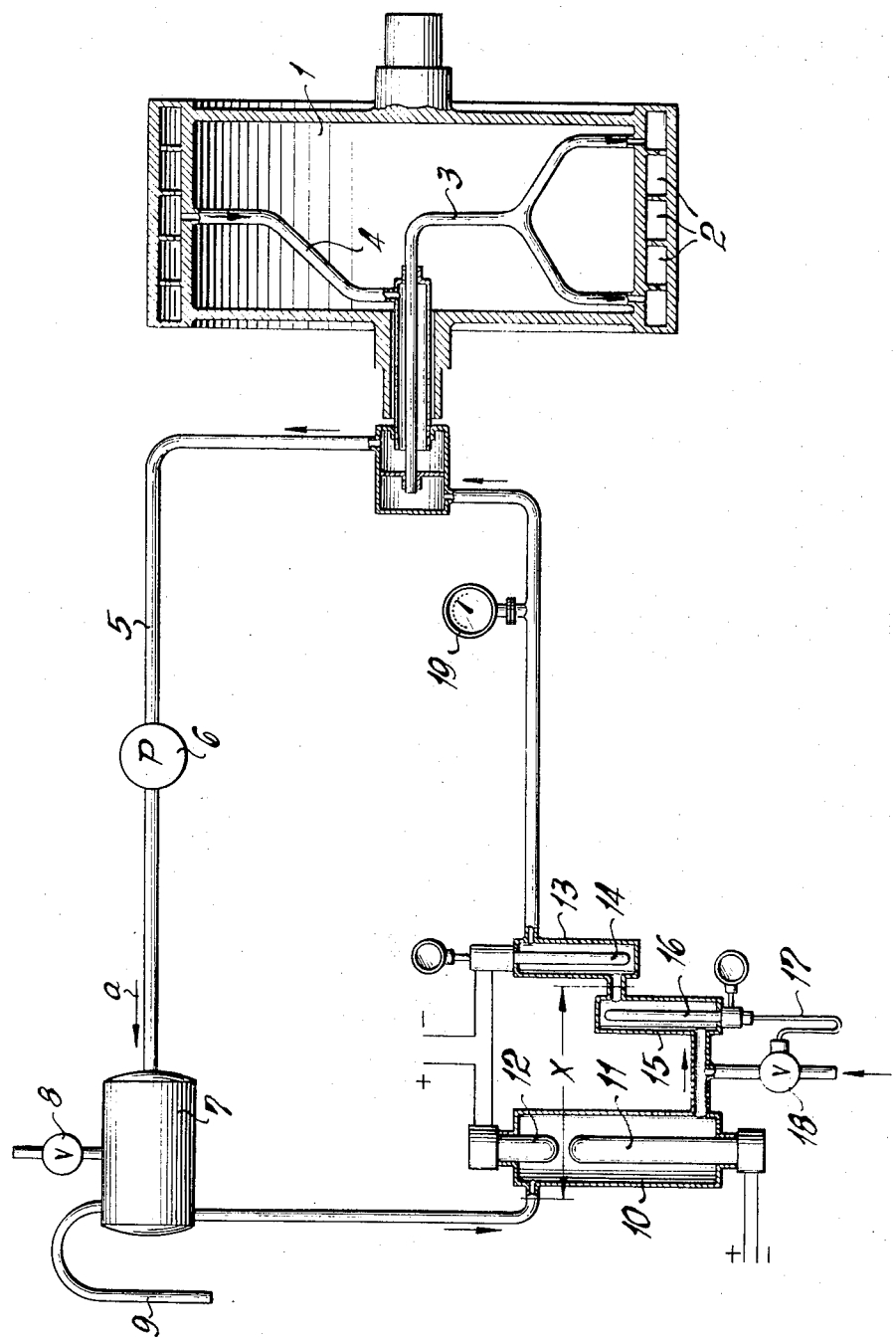

MULTICOLOUR PRINTING PRESS COMPRISING A BACKING CYLINDER CONTAINING HEATING CHAMBERS

The invention relates to control apparatus for maintaining at a substantially constant value the temperature of a backing cylinder of a multi-colour printing press.

The accuracy with which the individual impressions produced by a multi-colour printing press finally coincide on the printed article depends to a large extent on the degree of temperature fluctuations to which a common backing cylinder of the printing press may be subjected during printing. Such temperature fluctuations are, for example, occasioned by heated dry air used for drying each impression before the next impression is applied. Variations in the temperature of the backing cylinder cause the latter to expand and may detrimentally influence its accurate rotation and give rise to a change in its peripheral speed. The coincidence of the individual colour impressions must be accurate to within fractions of a millimeter and therefore even slight expansion of the backing cylinder may cause misalignment of the colour impressions and make the printed article useless.

To minimise unallowable heat expansion, the backing cylinder is provided with heating chambers which are located in a flow circuit for a heating medium, preferably water. The circuit contains a heater and a thermostat which is intended to control the heater so that the water is kept at a substantially constant predetermined temperature. This predetermined temperature corresponds to the temperature which the backing cylinder is expected to have during operation. To ensure accurate rotation of the backing cylinder during printing it is ground during manufacture whilst being kept at the predetermined temperature.

However, experience has shown that temperature control of the backing cylinder with the aid of the thermostat is not sufficiently accurate to meet the requirements of the coincidence of the individual colour impressions. More particularly, it has been found that the thermostat over-controls the supply of heat from the heater. When the thermostat has switched the heater off, the over-heated water located in the circuit between the thermostat and the heater will still reach the heating chambers of the backing cylinder and the predetermined temperature of the latter will therefore be exceeded. As a result, the backing cylinder is subjected to constant temperature fluctuations which detrimentally influence the accuracy with which the individual colour impressions coincide on the printed article.

The invention aims to minimise the temperature fluctuations caused by the aforementioned thermostat control.

According to the invention, there is provided control apparatus for maintaining the temperature of a backing cylinder of a multi-colour printing press at a substantially constant value, comprising a circuit for a heating medium, said circuit including a flow path through heating chambers in the backing cylinder, means for heating the medium, a thermostat downstream of the heating means for controlling the heating means, and a temperature regulator interposed between the heating means and the thermostat, said regulator being operatively connected to a supply of cold medium and being effective to introduce a controlled amount of cold medium in the circuit at a location between the heating means and the thermostat when the temperature of the heating medium exceeds a predetermined value.

By means of the invention, the temperature regulator therefore reduces the temperature of the over-heated medium, which is preferably water, before it reaches the backing cylinder and thus temperature fluctuations of the backing cylinder are minimised even though the thermostat may have been responsible for some over-heating of the water.

The thermostat and the temperature regulator preferably comprise temperature sensers which are disposed in the circuit closely downstream of the heating means so that the amount of cold water that is introduced in the circuit by reason of the temperature regulator is kept to a minimum. For the same reason, it is also preferred that the heating means are in the form of an electric resistance heater comprising a first heating element which is permanently energised and set to heat the medium to a mean value and a second heating element which is energised and de-energised by the thermostat, the second heating element preferably having a lower power than the first heating element.

An example of the invention will now be described with reference to the accompanying diagram of a control apparatus. The wall of a backing cylinder 1 for a multi-colour printing press is provided with heating chambers 2 which, by means of a supply conduit 3 and an outlet conduit 4 are included in a hot water circuit 5. The flow of hot water takes place in the direction of the arrow *a* and is maintained by a pump 6. The water flows through an equalising vessel or header tank 7 located at the highest level in the circuit. This header tank is equipped with a ventilating valve 8 and a water overflow pipe 9. The circuit 5 also contains an electric resistance heater 10 for the water. The heater 10 comprises a heating element 11 which is permanently energised to heat the water to a mean temperature and a heating element 12 which preferably has a lower heating power than the element 11 and which is controlled by a thermostat 13 so that it becomes energised only when the water temperature exceeds a predetermined value. The thermostat 13 has a temperature senser 14 which is disposed in the circuit as closely as possible downstream of the heater 10.

In a section of the flow path indicated by the arrows *x* in the drawing, that is to say between the heater 10 and the thermostat 13, there is included a temperature senser 16 of a temperature regulator 15. The temperature regulator may be of any suitable known construction. Its senser 16 contains a liquid which expands upon an increase in temperature and acts on a hydraulic control piston of a cold water mixing valve 18 through a capillary tube 17, the valve 18 opening into the circuit 5 at a position between the heater 10 and the senser 16 of the regulator 15.

Downstream of the thermostat 13, the hot water circuit includes a preferably graphic thermometer 19 which monitors the entire control apparatus and which, with the aid of setting means (not shown) provided on the thermostat 13 and the temperature regulator 15, facilitates control of the desired predetermined temperature of the water circuit and thus of the backing cylinder.

As the temperature of the circulated water drops below that set on the thermostat 13 and the temperature regulator 15, the thermostat 13 energises the heating element 12 of the heater 10 until the water in the circuit 5 is back to the predetermined temperature. However, before all the water in the circuit has reached the predetermined temperature, the temperature fluctuates repeatedly, i.e., hunting occurs, and such temperature fluctuations are more severe the greater the heat output from the element 12 differs from the amount of additional heat that is actually required by the water. Since the heating element 12 must be set for the largest heat loss to which the water circuit is expected to be subjected, the element 12 will almost always cause the water to become overheated in the section $x$ of the circuit 5. Although the senser 14 of the thermostat 13 will then respond by de-energising the element 12, the over-heated water in the section $x$ of the circuit will reach the backing cylinder 1. Also, the over-heated water will be followed by a section of water which is now no longer heated by the element 12 and as soon as this cooler water reaches the senser 14, the latter will energise the element 12 again. Temperature fluctuations are therefore set up and considerable time normally elapses before these fluctuations are eliminated. In the meantime, the backing cylinder 1 is likewise subjected to temperature fluctuations and the quality of the printed articles is detrimentally influenced by inaccuracies in the alignment of the individual colour impressions.

The temperature regulator 15 is effective to correct overheating of the water caused by the thermostat 13. Before the over-heated water reaches the senser 14 of the thermostat 13, the regulator 15 causes a controlled amount of cold water to be added to it through the valve 18. Accordingly, the temperature of the over-heated water is automatically reduced and severe temperature fluctuations of the water are suppressed within the section $x$ of the flow path, i.e., before the water reaches the backing cylinder 1. An amount of hot water corresponding to the amount of cold water introduced through the valve 18 is withdrawn from the circuit 5 through the overflow pipe 9 of the header tank 7.

We claim:

1. Control apparatus for maintaining the temperature of a backing cylinder of a multi-colour printing press at a substantially constant value, comprising a circuit for a heating medium, said circuit including a flow path through heating chambers in the backing cylinder, means for heating the medium, a thermostat downstream of the heating means for controlling the heating means, and a temperature regulator interposed between the heating means and the thermostat, said regulator being operatively connected to a supply of cold medium and being effective to introduce a controlled amount of cold medium in the circuit at a location between the heating means and the thermostat when the temperature of the heating medium exceeds a predetermined value.

2. Control apparatus according to claim 1, wherein said thermostat and said temperature regulator comprise temperature sensors which are disposed in the said circuit closely downstream of the heating means.

3. Control apparatus according to either preceding claim, wherein the heating medium is water.

4. Control apparatus according to any preceding claim, wherein the heating means are in the form of an electric resistance heater comprising a first heating element which is permanently energised and set to heat the medium to a mean value and a second heating element which is energised and de-energised by the thermostat.

5. Control apparatus according to claim 4, wherein the second heating element has a lower power than the first heating element.

* * * * *